Patented Nov. 9, 1926.

1,605,929

UNITED STATES PATENT OFFICE.

VIGGO DREWSEN, OF LARCHMONT, NEW YORK, ASSIGNOR TO WEST VIRGINIA PULP AND PAPER COMPANY, OF NEW YORK, N. Y., A CORPORATION OF DELAWARE.

PROCESS OF TREATING WASTE MAGNESIUM MONOSULPHITE COOKING LIQUOR.

No Drawing. Original application filed April 3, 1922, Serial No. 549,197. Divided and this application filed December 17, 1924. Serial No. 756,615.

This application is a division of my copending application Serial No. 549,197, filed April 3, 1922, on which U. S. Patent No. 1,549,189 was issued to me on August 11, 1925, as a partial continuation of my copending application Serial No. 397,484, filed July 19, 1920, on which application Patent No. 1,511,664 for a "process of making fiber paper, etc." was issued to me October 10, 1924.

This invention relates especially to processes of treating the waste monosulphite cooking liquors which are produced in the digestion of straw, corn stalks, wood, and other fibrous material, for the production of paper pulp etc. so as to recover the valuable inorganic constituents of such liquors and prepare the cooking liquors for reuse in fibre digestion. The waste magnesium monosulphite liquor from the digester, preferably after precipitating out with calcium salts any sulphates or sulphites in the waste liquor, may be treated and preferably boiled with slaked dolomite lime so that the calcium component thereof precipitates the magnesium hydroxide which has been held in solution in various organic combinations in the waste liquor together with the magnesia of the dolomite lime which may be removed by filter pressing. This precipitated magnesium hydroxide may be transformed into the monosulphite in various ways as by treating it with sulphur dioxide which may be percolated through liquor containing the magnesium hydroxide in suspension so that magnesium monosulphite may be formed for use in cooking the raw fibre, as more specifically described and claimed in my aforesaid copending divisional application. According to the present process, however, the precipitated magnesium hydroxide is purified by calcining the same to eliminate therefrom any traces of organic material, and the resulting magnesia may be treated while suspended in water with carbon dioxide under pressure so as to produce magnesium bicarbonate which goes into solution. This solution may then be treated with sulphur dioxide or with magnesium bisulphite in proper proportions so as to form the desired magnesium monosulphite while concentrated carbon dioxide is simultaneously produced which can be used in the preceding step of the process.

In commercially operating this process, the waste magnesium monosulphite liquor from the raw fibrous material may advantageously have the sulphates and also sulphites remaining therein from the original cooking liquor removed by precipitating out with any suitable calcium salts. For this purpose the waste liquor from this recovery process containing waste calcium organic compounds such as calcium lignosulphonate may be added and stirred into the waste liquor received from the digester so long as a substantial calcium precipitate continues. By filter pressing, this preliminarily removes these sulphates and sulphites which might otherwise contaminate the precipitated magnesium hydroxide formed in the liquor. This purified waste digester liquor may then be treated with calcined and slaked dolomite lime preferably in finely divided form or in water suspension and this brings down, with the magnesia of the dolomite, the magnesium hydroxide which had been held in organic solution in the waste liquor. Both these magnesia components may be removed by filter-pressing, the filtrate being the calcium waste liquor which may be used for preliminarily removing the sulphates, etc. as above indicated. This magnesia is preferably purified by calcining to eliminate any traces of combined organic material, and then it may be dissolved by carbon dioxide treatment under pressure to produce the acid magnesium carbonate or bicarbonate of magnesium. This solution may advantageously be filter-pressed which thus removes any silica or other insoluble material; and the solution may then be treated with magnesium acid sulphite which produces the normal sulphite of magnesia and liberates concentrated carbon dioxide which may be reused in the other step of the process to the extent necessary, and the surplus sold. A surplus of magnesia is also produced in this process which can be disposed of so as to help pay for the primary raw treating materials, dolomite and sulphur or pyrites.

This invention has been described in connection with a number of illustrative materials, proportions, conditions, arrangements and orders of steps, to the details of which disclosure the invention is not of course to be limited, since what is claimed as new and what is desired to be secured by Letters Patent is set forth in the appended claims.

I claim:

1. The process of treating the waste magnesium monosulphite treating liquor produced in the digestion of vegetable fibrous material, which comprises boiling the treating liquor with slaked burned dolomite lime to precipitate magnesium hydroxide, filtering out the precipitate and dissolving the same in carbon-dioxide solution under pressure, and filtering and treating the resulting magnesium bicarbonate solution with magnesium acid sulphite to produce magnesium monosulphite for reuse as such treating liquor.

2. The process of treating the waste magnesium monosulphite treating liquor produced in the digestion of vegetable fibrous material, which comprises boiling the treating liquor with slaked lime to precipitate magnesium hydroxide, filtering out the precipitate and dissolving the same in carbon-dioxide solution under pressure, and treating the resulting magnesium bicarbonate solution with magnesium acid sulphite to produce magnesium monosulphite for reuse as such treating liquor.

3. The process of treating the waste magnesium monosulphite treating liquor from the digestion of vegetable fibrous material, which comprises combining with the treating liquor slaked dolomite lime containing sufficient calcium hydroxide to substantially precipitate the magnesium hydroxide from said treating liquor, filtering out and calcining the precipitate and dissolving the same in carbon-dioxide solution under pressure to form magnesium bicarbonate solution, treating said solution with material comprising available sulphur dioxide and forming magnesium monosulphite therefrom.

4. The process of treating the waste magnesium monosulphite treating liquor from the digestion of vegetable fibrous material, which comprises combining with the treating liquor slaked lime containing sufficient calcium hydroxide to substantially precipitate the magnesium hydroxide from said treating liquor, calcining the precipitate and dissolving the same in carbon-dioxide solution to form magnesium bicarbonate solution, treating said solution with material comprising available sulphur dioxide and forming magnesium monosulphite therefrom.

5. The process of treating the waste magnesium monosulphite treating liquor from the digestion of vegetable fibrous material, which comprises combining with the treating liquor slaked dolomitic lime and precipitating magnesium hydroxide from said treating liquor, calcining the precipitate and dissolving the same in carbon-dioxide solution under pressure to form magnesium bicarbonate solution and forming magnesium monosulphite therefrom.

6. The process of treating the waste magnesium monosulphite treating liquor from the digestion of vegetable fibrous material, which comprises combining with the treating liquor slaked lime and precipitating magnesium hydroxide from said treating liquor, calcining the precipitate and dissolving the same to form magnesium bicarbonate solution and forming magnesium monosulphite therefrom.

7. The process of treating the waste magnesium monosulphite treating liquor produced in the digestion of vegetable fibrous material, which comprises removing sulphates or sulphites from the treating liquor, reacting on the purified treating liquor with slaked lime to precipitate magnesium hydroxide from said treating liquor, dissolving the precipitate in carbon-dioxide solution under pressure, and filtering and treating the resulting magnesium bicarbonate solution with magnesium acid sulphite to produce magnesium monosulphite for reuse as such treating liquor.

8. The process of treating the waste magnesium monosulphite treating liquor produced in the digestion of vegetable fibrous material, which comprises removing the sulphates or sulphites from the treating liquor, reacting on the purified treating liquor with slaked lime to precipitate magnesium hydroxide from said treating liquor, dissolving the precipitate in carbon-dioxide solution and treating the resulting magnesium bicarbonate solution to produce magnesium monosulphite for reuse as such treating liquor.

9. The process of treating the waste magnesium monosulphite treating liquor produced in the digestion of vegetable fibrous material, which comprises removing the sulphates or sulphites from the treating liquor, reacting on the purified treating liquor with slaked dolomitic lime to precipitate magnesium hydroxide from said treating liquor, dissolving the precipitate in carbon-dioxide solution and treating the resulting magnesium bicarbonate solution to produce magnesium monosulphite for reuse as such treating liquor.

VIGGO DREWSEN.